Oct. 21, 1947.  T. A. LA BRECQUE  2,429,321
FILTER
Filed March 27, 1943  4 Sheets-Sheet 4
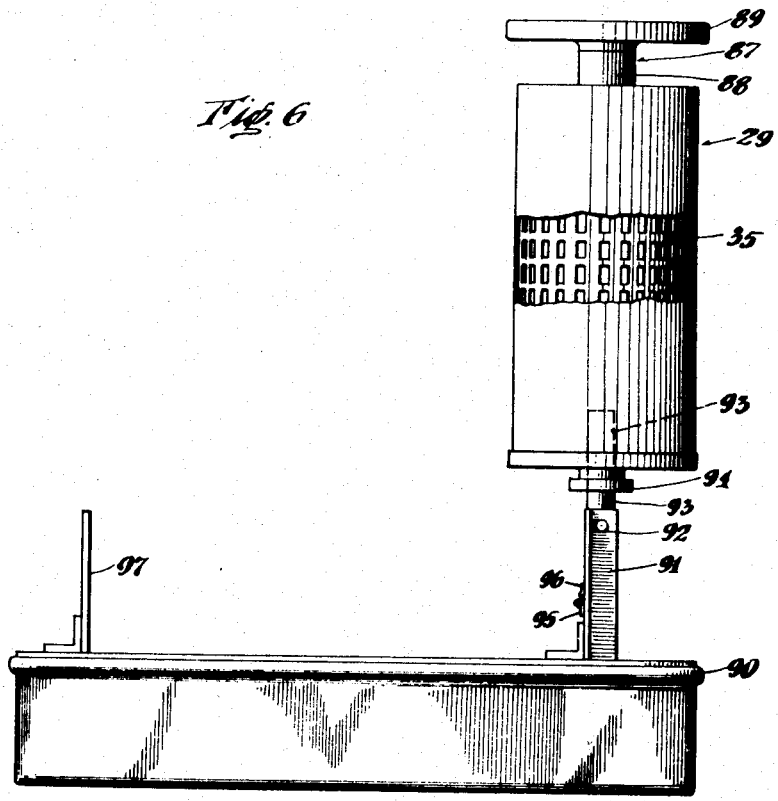
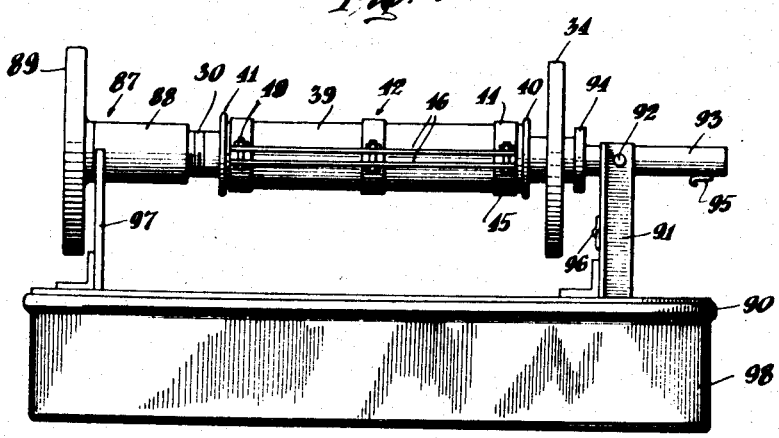
INVENTOR.
Theodore A. LaBrecque
BY
ATTORNEYS Patented Oct. 21, 1947

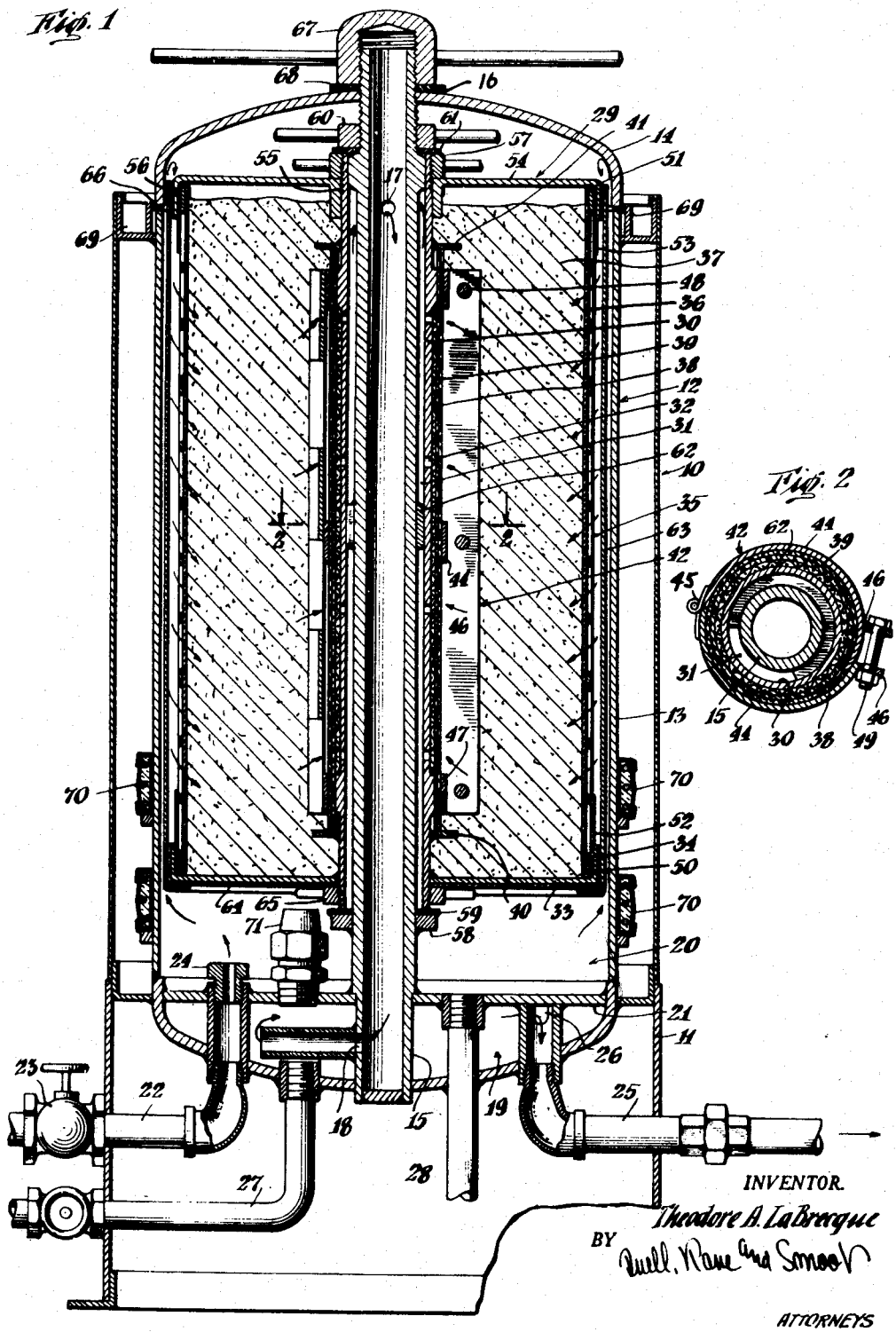

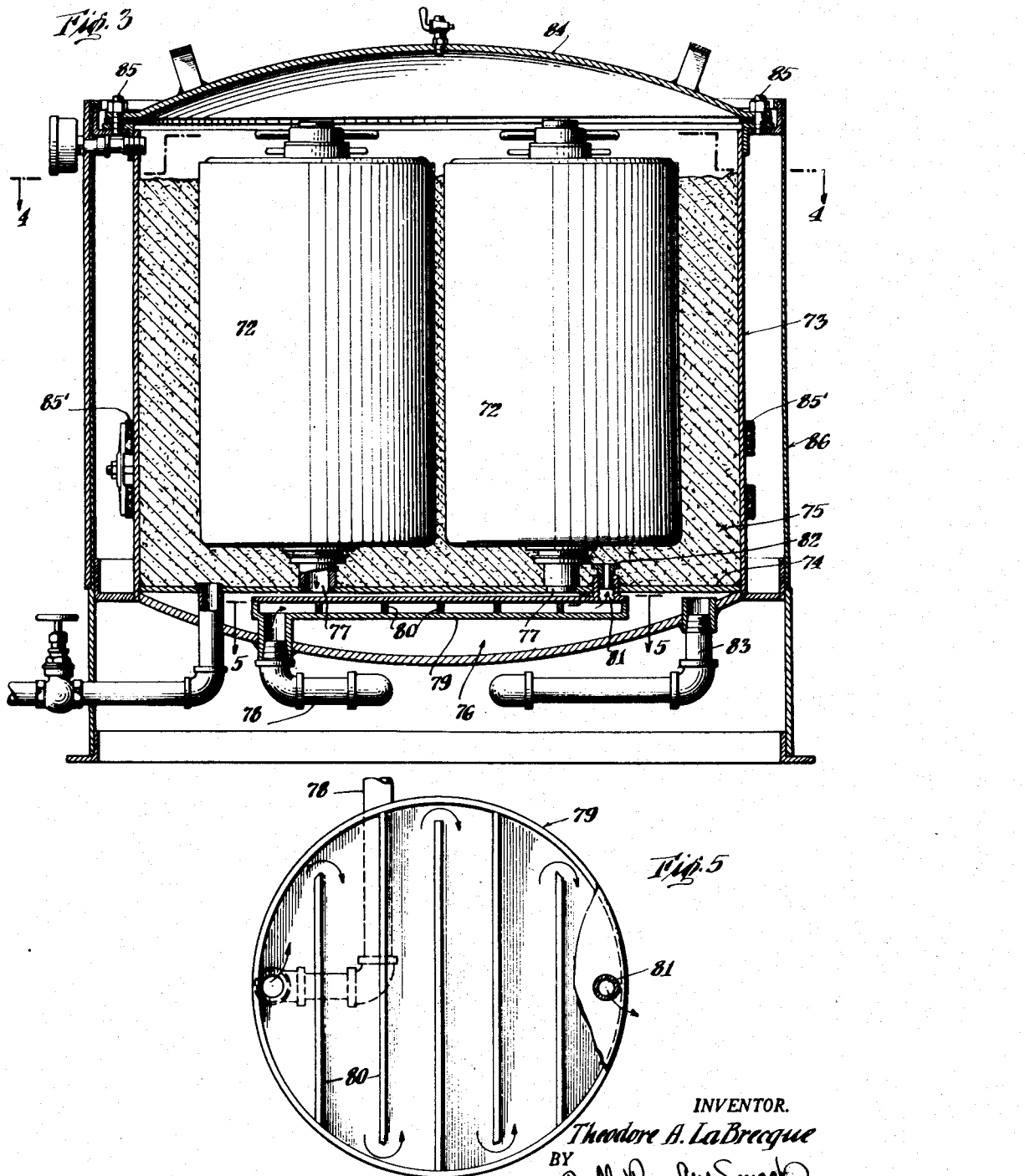

2,429,321

UNITED STATES PATENT OFFICE 2,429,321

FILTER

Theodore A. La Brecque, Elmira, N. Y., assignor to The Hilliard Corporation, Elmira, N. Y., a corporation of New York Application March 27, 1943, Serial No. 480,755

5 Claims. (Cl. 210—183)

This invention relates to a filter and has particular adaptability as an oil filter used for purifying lubricating oils used in Diesel, gasoline, and other engines and for the purification of insulating industrial oils of various kinds such as used in hydraulic presses, wire drawing machines, etc.

It is an object of this invention to provide a filtering unit which may be directly connected to the lubricating system of engines or other equipment for continuous or intermittent filtering with the oil being forced through the filter by the pressure of the engine system if adequate, or by a separate pumping system. The same unit may, if desired, be used for batch filtering.

It is a major object to provide such a unit having a novel filter cartridge permitting the use of low cost filtering materials and being constructed for great ease in the change of the filtering material and the cleaning of the unit.

It is a further object to provide such a unit wherein filters of varying capacities may be provided by the utilization of a standard lightweight, easily handled filter cartridge adapted for placement in either single or multiple assemblies, as desired.

A still further object of the invention is the provision of a novel filter unit of high efficiency due to the novel arrangement whereby the heat from the clean outgoing oil may be transferred to the unfiltered incoming oil.

A still further object is the provision of a novel filtering cartridge in which the filtering materials can be readily changed and in which only the filtering material actually used is discarded. No metal or extra bindings or securing means of any kind need be discarded.

A still further object is the provision of a novel filtering device in which, on removal of the filter cartridge, no mixing of the uncleaned oil with the clean oil occurs. These and many other objects of this invention will be apparent from consideration of the drawings, and the description which follows.

In the drawings, Fig. 1 is a vertical cross section through a filtering unit utilizing a single filter cartridge.

Fig. 2 is a section along the line 2—2 of Fig. 1 and showing the details of construction of the filter fabric clamp.

Fig. 3 is a vertical cross section of a multiple cartridge assembly, and

Fig. 5 is a cross sectional view taken along the line 5—5 of Fig. 3 showing the details of the multiple filter heat exchanger.

Fig. 6 is a front elevation partly in section of the cartridge out of the container and in place on a service rack.

Fig. 7 is a front elevation of the service rack and cartridge after a portion of the cartridge assembly has been removed.

Figure 4:
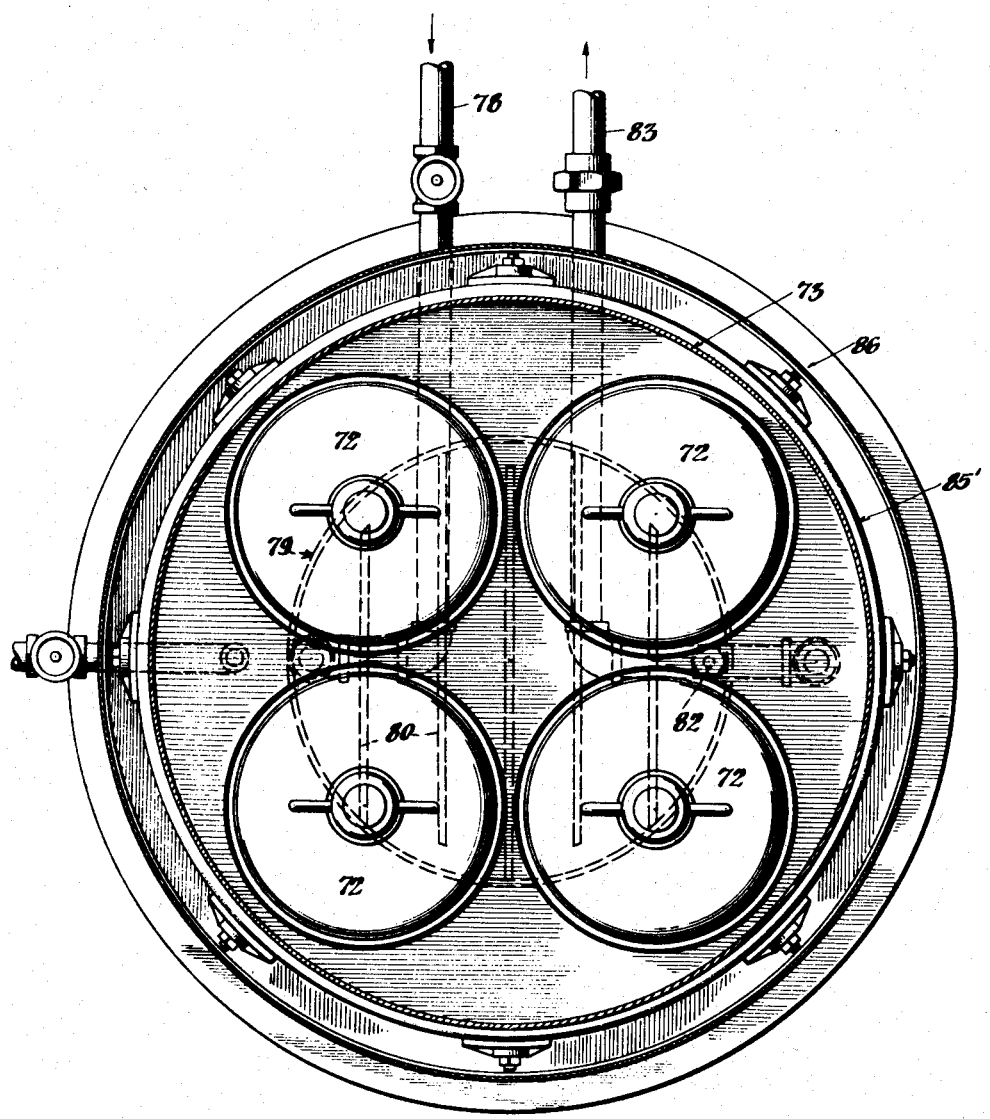
Fig. 4 is a view taken along the line 4—4 of Fig. 3 looking in the direction of the arrows.

From Fig. 1 it will be seen that the unit comprises generally an exterior housing 10 having a suitable base portion 11. This housing is preferably of cylindrical shape although other desired shapes may be used, and is formed of any suitable metal or other material. Secured within this housing in any suitable manner is the cylindrical oil container or casing generally referred to as 12 and which comprises a bottom portion 13 and cover 14. Centrally positioned in and secured to the oil casing 12 is the drain tube 15 extending upwardly from the bottom of the container 13 and preferably extending through the opening 16 in the cover. This tube is provided near its upper portion with an inlet opening or openings 17 and near its lower portion with an outlet opening 18. Positioned above the outlet 18 and dividing the oil casing into a lower compartment 19 and an upper compartment 20 is a dividing partition 21 made of metal or other material having high heat exchange properties.

Incoming or dirty oil or other fluid being filtered is delivered into the upper compartment 20 through inlet 22 generally provided with a shut-off valve 23 and orifice 24 which is readily removable and which may be varied in size of opening for the regulation of the quantity of flow.

The clean oil outlet 25 secures its supply of clean oil from the bottom compartment 19 through its opening 26. As indicated, the opening 26 is disposed immediately beneath the plate 21, thereby insuring that said plate is in contact with the oil in the outflow chamber 19, to be subject to the temperature condition therein. If desired, the control for the volume of flow may be provided for in the outlet line 25 rather than the inlet line 22 by means of placing therein an adjustable valve or orifice. Suitable drains 27 and 28 are provided respectively for the lower compartment 19 and upper compartment 20 and may be controlled by any suitable valves.

To provide for the proper filtering and cleaning of the oil, a filter cartridge assembly is placed in the oil container so that the oil passing from the inlet orifice 24 into the drain opening 17 and thence to the lower compartment 19 must pass through said filter cartridge.

This filter cartridge unit generally referred to as 29 is, in the preferred form, of general cylindrical configuration and of a size and weight so that when completely filled with a filtering material and in saturated condition it may, nevertheless, be readily handled and serviced. The entire cartridge 29 is retained by suitable means so that it may be removed as a unit and then readily opened, serviced and replaced.

As shown, the filter cartridge unit comprises an elongated tube or core 30 whose internal diameter is somewhat larger than the external diameter of drain tube 15 so that when the tube 30 is placed over the drain tube 15 a space 31 is provided through which oil may flow. The tube or core 30 is formed with a suitable number of openings 32 which communicate with space 31. Welded or otherwise secured at a position slightly above the bottom or end of said core 30 is a circular base 33 provided at its periphery with an upwardly extending flange 34. A perforated supporting member 35 is adapted to be placed within the base 33 and is retained from outward movement by the upstanding flange 34. This supporting member preferably takes the form of a perforated or meshed steel basket and is formed by rolling a mesh steel wire into a cylindrical shape. This basket acts to retain the flannel tube or other holding means 36 into which the filtering material 37, which may be fuller's earth or other suitable substance, is placed.

Before describing the manner of inserting the flannel tube within the basket and then securing the entire cartridge assembly in place, I will first describe the assembly of the filter fabric around the central core 30 because in asembly that will be the more natural sequence of operations.

As previously pointed out, the central core 30 is provided with one or more openings 32. Surrounding this core and acting as a spacer is a wire mesh screen 38. Wound about that wire in one or more convolutions is a filter fabric or material 39 which may consist of flannel, paper, or other suitable material capable of preventing the passage of filter substance 37 therethrough and yet permitting oil passage. In order to secure a proper winding and centering of the filter fabric 39 on the core 30, that core is provided with spaced centering projections 40 and 41 between which the fabric may be wound.

After the fabric has been wound about the core, and in order to secure it in place, clamping means generally referred to by the numeral 42 are used for its retention.

Taking Figs. 1 and 2 together, the construction of this clamping means will be clear. This clamp consists of a series of spaced slit rings, the specific clamp illustrated comprising three, each made of two semi-circular flat bands 44 hinged on one side by means of the hinge structure 45. One of the bands preferably extends to underlie the other band when in clasped position. On the opposite side from the hinge are two rigid flat bars 46 preferably metal, which extend at right angles to the securing bands 42 and are each connected respectively to three of the semi-circular bands. These bars 46 preferably have notches 47 of a depth sufficient to receive the bands so that the inner surface of said bands may lie flush with the inner face or edge of the bars. The bars 46 are provided at suitable spacing with holes 48 adapted to receive securing means such as that of the nut and bolt 49 shown in Fig. 2.

It will be seen that by placing this clamping structure over the core after the filter fabric has been wound about it, that a very suitable clamping of the fabric is obtained. The edges of vertically disposed bars 46 press throughout their length against the filter fabric and thereby provide a good seal so that particles of dirt and loose filter material 37 will not find their way through the lines of fold of the filter fabric material.

Now that the central tube of the cartridge assembly has been properly wound and secured, the next step, as has been previously mentioned, is the placing of the basket structure 35 in place. As will readily be seen, this basket structure is for the purpose of providing a means of holding the filtering material in place. This filtering material may consist of various substances such as fuller's earth, processed cotton waste, wood pulp, etc. This filtering material may come in made-up cartridges ready for insertion into the basket structure, or the users may desire to secure the filtering material in bulk and to refill the filter from that bulk material. The structure of Fig. 1 is a preferred type of structure which permits the operator to use bulk filtering material such as fuller's earth or cotton waste and to replace the filter material on the job.

This structure has many advantages of economy and servicing and has been found highly desirable in use. An open tube 36 of canvas, flannel, paper, or other material suitable to hold the filtering material used and yet capable of passing oil therethrough is provided. This tubular member is placed inside of the supporting basket 35 and is then turned back on itself at both the bottom 50 and the top 51 of the supporting member 35 and then extended for a short distance along the side of the supporting member as shown at 52 and 53. This basket and tube are then placed on the base 33. The cartridge is then ready to receive the filtering material 37 which is placed therein in any suitable manner. Thereafter, the cover member 54 of the cartridge assembly is placed in position with its central opening 55 receiving the tube or core 30 and its flanges 56 engaging the downwardly turned fabric 36. Due to this turning of the fabric tube back on itself, the fabric acts as a seal or gasket at its point of contact adjacent the base 33 and the cover 54 of the cartridge assembly.

Thereafter wing nut 57 is threaded on to the upper end of the core 30 and is tightened so as to hold the cover securely in position and to provide for a tight gasket seal both with the base 33 and the cover 54. After the securing of this nut, the filter cartridge unit can be handled as a single unit and placed in position over the central drain tube. It will be observed that near the lower portion or bottom of the drain tube a stop 58 is secured thereto. Placed on top of that stop and between it and the bottom end of the core 30 is a gasket 59. It will thus be seen that this gasket acts as a seal to prevent unfiltered oil from entering into the space 31.

In order to hold the cartridge unit in position and so that the seal against the gasket 59 may be maintained, a wing nut 60 in threaded engagement with the central core or drain tube is provided and, preferably positioned between the wing nut 57 and the cartridge assembly, is a gasket 61.

If desired, supporting spacers 62 may be positioned between the drain tube and the surrounding core. It is apparent that by the use of such supporting spacers the surrounding core may be fabricated from lighter material than might otherwise be desirable considering the pressure under which the unit may be operated.

In some installations it has been found desirable to provide a shield or baffle for the filter cartridge unit. A very suitable structure is that shown in Fig. 1 comprising a cylindrical sheet metal shield 63 open at its top and formed at its bottom with a base 64 provided with a central opening adapted to receive the core 30. In order to secure the shield to the cartridge unit so that it may be removed together with it as a unit, wing nut 65 is adapted to fit over the bottom threaded portion of the core 30 and thereby hold the shield in position.

Gasket 66 may be placed between the removable cover 14 and the container 13, and the cover held in place by means of the threaded wing nut 67 engaging the threads provided on the upper part of the central drain tube 15. If desired, interposed between the nut and the cover may be washer 68.

A suitable channel 69 may be positioned near the top of the oil container 12 and secured thereto and act both as a channel for receiving any oil which might pass between the cover portion and the base portion of the oil container as well as a supporting member between the oil container and the exterior housing 10.

In some units, and dependent upon the filtering material used, it may be desirable to raise the temperature of the incoming oil. As shown, this is achieved by means of suitable heating units such as the electric resistance heaters 70 positioned about the exterior of the oil container and controlled by suitable thermostatic means not shown.

To provide against any damage as the result of excess pressure which might be built up in the filter due to clogging, etc., a relief valve 71 is provided which, in the event of such stoppage of flow would by-pass the oil coming in through the orifice 24 directly into the lower compartment 19 of the oil container.

From this description and the drawings, it should be readily understood that for servicing the unit shown in Fig. 1 and replacing the filter material 37 the operations will be in the following simple sequence.

First, wing nut 67 is removed and then the cover 14 is lifted off. Thereafter removal of wing nut 60 releases the entire filter cartridge unit which includes the shield 63 if that shield is used. Thereupon a suitable tool for engaging the wing nut 57 may be used and the entire unit lifted from the oil container. In some cases, before removal, the wing nut 57 may be unscrewed and replaced with a special removing handle similar to that shown in Figs. 6 and 7 and which will be more fully described hereinafter. The filter cartridge assembly is thus removed, cover 54 taken off and the filter material 37 removed. The necessary parts may be cleaned if desired and, when necessary, gasket 59 replaced. When desired the filter fabric which surrounds the central core may be easily replaced by the removal of the hinged clamping structure 42. Thereafter the filter material 37 is replaced and the cartridge reassembled and placed back in the container. It should be observed that placement of the opening 17 high in the drain tube prevents dirty oil which is in the upper compartment from entering it as the cartridge is removed. This thus prevents the dirty oil from coming into the clean drain oil tube.

Referring now to Figs. 3, 4, and 5 we observe an oil filter structure utilizing a multiplicity of filter cartridges in a single casing. Any number of cartridges may be used. The unit shown comprises a multiple filter having four individual filter cartridges, each cartridge being of a structure similar to that described in connection with Fig. 1 and Fig. 2. These cartridges generally referred to as 72 are secured in a manner similar to that described in connection with Fig. 1. A large cylindrical oil container 73 is provided with a dividing partition 74 dividing the container into an upper compartment 75 and lower compartment 76. A plurality of spaced drain tubes 77 are mounted on said dividing partition with openings in communication with the lower compartment. These tubes are sufficiently spaced so that each is adapted to receive a cartridge filter unit 72.

The oil inlet pipe 78 enters a baffled passageway 79 having a series of staggered baffles 80 thereby providing a tortuous passageway for the incoming oil. This baffled passageway is positioned in the lower compartment 76 and is provided at its outlet end with an opening 81 in communication with the upper compartment 75 and provided with a removable orifice 82 similar to the orifice 24 of Fig. 1.

The oil enters through the orifice 82 into compartment 75 then flows through the filter elements and then through their respective drain tubes into the lower compartment 76 and thence out through the clean oil outlet openings into outlet pipes 83. The cover structure 84 for the multiple filter units varies from that shown for the single filter unit in that the central drain does not pass through it. Instead the cover structure is secured about its periphery to the lower portion of oil container 73 by means of the bolts 85. In view of the fact that the central drain tubes do not extend to a point above the cover 83, it is of course necessary to be sure that the opening in the top of the drain tubes is properly closed. This may be done by providing plugs for the drain tube ends or in some other suitable manner.

Heating members 86' may be provided and the unit encased in any suitable housing 86 in a manner similar to that described in connection with Fig. 1.

By the use of this structure in which the dividing partition 74 is provided with a multiplicity of upstanding central drain tubes on which separate filter cartridges may be secured, there is provided an oil filter which has great flexibility of capacity and is readily serviced. The capacity of the unit may be varied by varying the number of filters used. The unit is easily serviced because no matter how many cartridges are used, each remains a standard size sufficiently small to enable ready handling thereof so that it may be removed and serviced by one man without the need for complicated hoisting or other machinery.

It is also observed that by the use of the multiple cartridges in a single casing a large filtering area is obtained thus assuring maximum flow of the oil for the longest period of time. It should also be observed that due to the arrangement of the separate cartridge filters in parallel, in addition to a large filtering area being obtained, the oil may be passed through the unit utilizing the same pressure in the multiple cartridge unit as that used in the single cartridge unit.

Referring now to Figs. 6 and 7, it is observed that I have illustrated therein the use of a special rack for handling the cartridge upon removal, as well as the use of a special handle for removing the cartridge from the oil container.

Handle 87 is provided with an internally threaded shank 88 which is adapted to be threaded in place on core or tube 30. The handle is also provided with the projections or extensions 89 which serve as a means of gripping the handle for removal of the cartridge unit and is closed at its top so that it acts as a stopper or seal for the tube or core 30 when the handle is in position on that core.

As illustrated, the service rack for receiving the cartridges comprises essentially a rectangular or similarly shaped base 90 provided at or near one end with two vertically positioned uprights 91 supporting between them a pivotal pin 92. Pivoted on this pin is a core tube holding member or spindle 93 which preferably takes the form of a tubular member adapted to fit within the core 30. A resting stop 94 is positioned on the tubular member 93 and the tubular member extends beyond that stop for a sufficient distance to project into the core of the cartridge to hold the cartridge securely in position thereon. A latch 95 and cooperating engaging member 96 are provided so that the tubular member 93 may be held in locked upright position as shown in Fig. 6.

At the opposite end of the service rack an upstanding member 97 is provided and is adapted to receive and rotatably support the cartridge member when that member is moved to a horizontally disposed position.

As shown, and in preferred form, the service rack is made in two pieces, the one a support from which the uprights 91 and 97 are secured and the other a drain pan 98 on which the service rack is placed. This structure permits ease of handling and cleansing. It may be desirable to make the rack and drain as a single unit and such a structure is within the spirit of my invention.

The operation of the service rack is evident from the drawings. After the various securing members have been removed from the unit in assembled position (Fig. 1), the cover 54 is taken off and the handle member 89 is screwed down on to the top of the core. The entire cartridge assembly can then be removed and, as shown in Fig. 6, is placed upon the tube 93 which is then in latched upright position. In this position the entire basket structure 35 and tube 36 can be removed together with the used filtering material. The remainder of the cartridge assembly can then be lowered into the position shown in Fig. 7 by releasing the latch 95. In this position the coil or tube felt and the clamp structure can be cleaned by the use of a suitable cleaning fluid and, when necessary, the felts may be replaced by removing the clamping means previously disclosed. Of course, since the cartridge may be rotated on the spindle 93, this structure is very useful in replacement of the felt about the core. Thereafter, the cartridge is lifted to its upright position and the tube and supporting basket structure reinserted and filled with the proper filtering compound—and then, by means of the handle 89, the cartridge with its clean filtering material is replaced into the oil container, the servicing handle 89 removed and the cover 54 put in place and secured by means of the clamps 57, and then the entire unit held down as previously described.

It will be seen that by the use of this structure a very efficient and serviceable unit is provided.

As has been previously pointed out, certain variations of this structure may be resorted to without in any way departing from the invention. I desire it understood that parts of the invention can be used without the whole and that the invention is not to be limited except as required by the appended claims.

I claim:

1. A filter comprising a container for receiving liquid, an imperforate heat-conducting wall separating said container into an upper and lower compartment, said lower compartment being of substantial volume, inlet means comprising a conduit extending through said lower compartment and opening into the upper compartment, outlet means opening into the lower compartment at a relatively high level thereof, liquid passage means connecting said upper and lower compartments, filter means interposed between said liquid passage means and said inlet whereby liquid flowing through container is filtered, and means for heating said liquid, the heat-conducting wall between said compartments serving to transfer heat from said lower compartment to said upper compartment.

2. A filter comprising a container for receiving liquid, a dividing wall within said container defining a filter chamber and an outflow chamber of substantial volume, a liquid outflow connection opening into said outflow chamber at a high point thereof, inlet means including a heat-conducting imperforate structure disposed within said outflow chamber, said structure having means for discharging inflowing liquid into said filter chamber and means whereby said inflowing liquid flows in a relatively lengthy path before discharging into said filter chamber, means for heating the liquid within said filter chamber, and filter means disposed within said filter compartment, comprising a perforated drain tube secured to and passing through said dividing wall and discharging into said outflow chamber, and a filter cartridge assembly, disposed about said drain tube, whereby liquid passes through said cartridge from the filter chamber to the outflow chamber.

3. A filter comprising a container for receiving liquid, a dividing wall within said container defining a filter chamber and an outflow chamber of substantial volume, a liquid outflow connection opening into said outflow chamber at a high point thereof, inlet means including a heat-conducting imperforate structure disposed within said outflow chamber, said structure having means for discharging inflowing liquid into said filter chamber and means whereby said inflowing liquid flows in a relatively lengthy path before discharging into said filter chamber, and filter means disposed within said filter compartment, comprising a perforated drain tube secured to and passing through said dividing wall and discharging into said outflow chamber, and a filter cartridge disposed about said drain tube, whereby liquid passes through said cartridge from the filter chamber to the outflow chamber.

4. A filter comprising a container for receiving liquid, a dividing wall within said container defining a filter chamber and an outflow chamber of substantial volume, a liquid outflow connection opening into said outflow chamber at a high point thereof, inlet means including a heat-conducting imperforate structure disposed within said outflow chamber, said structure having means for discharging inflowing liquid into said filter chamber and means whereby said inflowing liquid flows in a relatively lengthy path before discharging into said filter chamber, means for heating the liquid within said filter chamber, and filter means disposed within said filter compartment, comprising a perforated drain tube secured to and passing through said dividing wall and discharging into said outflow chamber, a filter cartridge assembly disposed about said drain tube, whereby liquid passes through said cartridge from the filter chamber to the outflow chamber, said filter cartridge being of substantially less diameter than the filter chamber, the space about said filter cartridge being substantially filled with discrete filter material.

5. A filter cartridge assembly, comprising a perforated tube; spaced closure plates, each having an aperture permitting passage of said tube, disposed adjacent the ends thereof, said closure plates having, respectively, a downwardly and an upwardly facing peripheral wall, a foraminated, relatively rigid cylinder having substantially continuous end walls positioned between said closure plates with the said end walls closely adjacent the inner surfaces of the raised walls of said closure plates; a fabric tube disposed substantially in contact with said foraminated cylinder and having its edges turned over the end walls of said cylinder; filter material within said fabric tube, and means for reducing the spacing between the said closure plates to clamp the foraminated cylinder and fabric tube therebetween.

THEODORE A. LA BRECQUE.

REFERENCES CITED

The following references are of record in the file of this patent:

UNITED STATES PATENTS

| Number | Name | Date |
| --- | --- | --- |
| 2,060,901 | Smith | Nov. 17, 1936 |
| 2,094,043 | Marshall | Sept. 28, 1937 |
| 2,176,816 | Huhn | Oct. 17, 1939 |
| 461,321 | Crouse | Oct. 13, 1891 |
| 678,708 | Weston | July 16, 1901 |
| 809,271 | Stambaugh | Jan. 2, 1906 |
| 2,200,795 | Krieck | May 14, 1940 |
| 2,287,526 | Krogman | June 23, 1942 |
| 2,311,377 | Gaertner | Feb. 16, 1943 |
| 2,068,473 | Schwalge | Jan. 19, 1937 |
| 368,629 | Trebau | Aug. 23, 1887 |
| 2,153,062 | Harlan et al. | Apr. 4, 1939 |
| 2,212,647 | Nugent | Aug. 27, 1940 |
| 2,250,299 | Downing | July 22, 1941 |
| 2,335,532 | Ream | Nov. 30, 1943 |
| 2,287,526 | Krogman | June 23, 1942 |
| 2,173,631 | Niedens | Sept. 19, 1939 |
| 1,565,988 | Cottrell | Dec. 15, 1925 |
| 1,595,345 | Lomax | Aug. 10, 1926 |
| 730,485 | Simoneton | June 9, 1903 |
| 388,017 | Brownlow | Aug. 21, 1888 |
| 2,325,399 | Houston | July 27, 1943 |
| 1,693,741 | Wuest | Dec. 4, 1928 |
| 1,630,504 | Walker | May 31, 1927 |
| 1,962,463 | Renfrew | June 12, 1934 |
| 2,100,951 | Glass et al. | Nov. 30, 1937 |
| 2,057,932 | Bolser | Oct. 20, 1936 |
| 619,569 | Hewel | Feb. 14, 1899 |

FOREIGN PATENTS

| Number | Country | Date |
| --- | --- | --- |
| 542,203 | Great Britain | Dec. 30, 1941 |